Patented Jan. 6, 1942

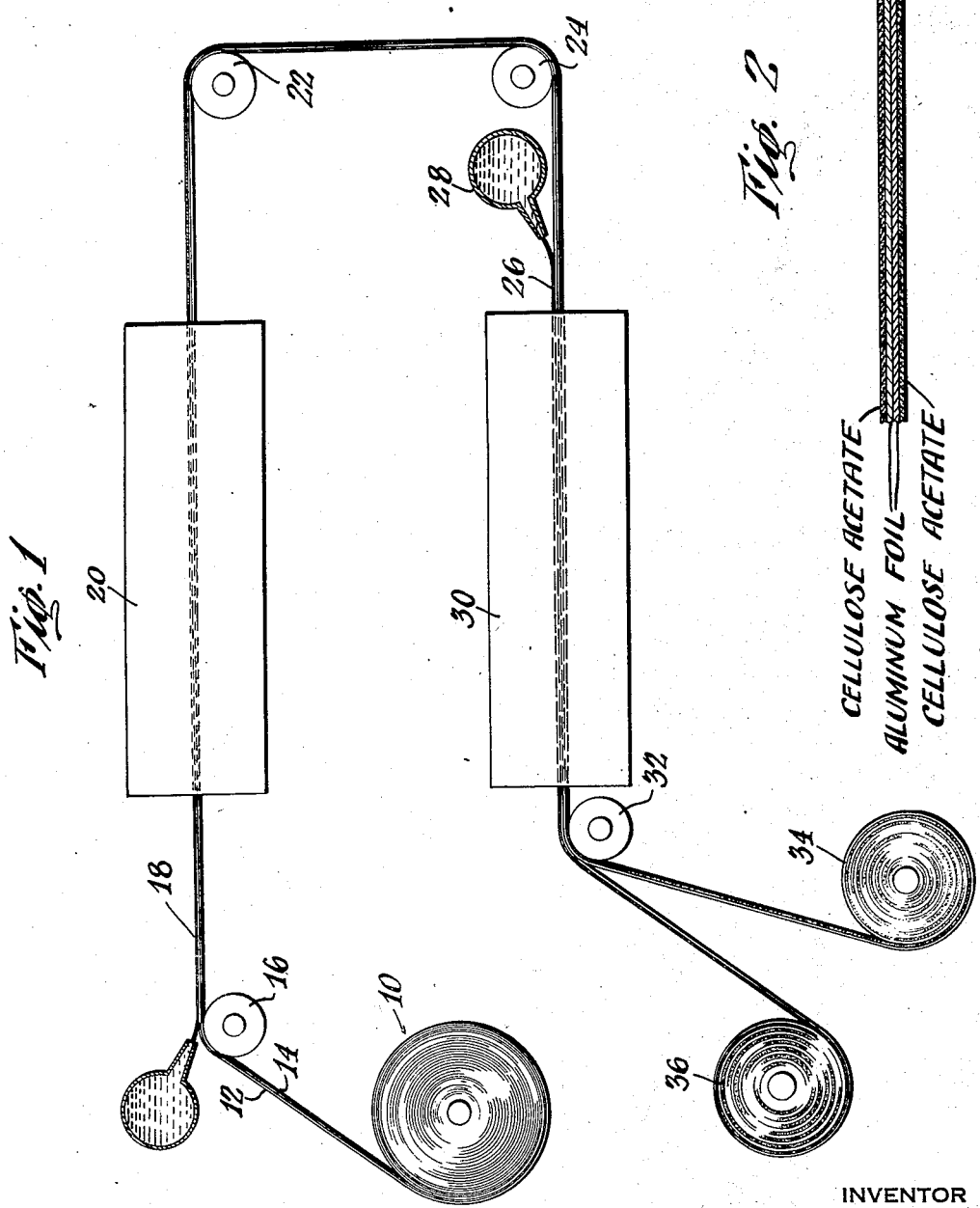

2,268,673

UNITED STATES PATENT OFFICE 2,268,673

METHOD OF COATING FRAGILE METAL FOILS

Richard Samuel Reynolds, Richmond, Va., assignor to Reynolds Research Corporation, Richmond, Va., a corporation of Delaware Application August 11, 1938, Serial No. 224,296

2 Claims. (Cl. 91—68)

This invention specifically relates to a new and improved method of coating thin metal foils, particularly aluminum foil, with various liquid filming materials such as cellulose derivatives of the type of cellulose acetate and cellulose nitrate, Vistanex, a polymerized straight chain petroleum hydro-carbon, rubber, or rubber derivatives of the type of chlorinated rubber and rubber hydrohalides, and various other solutions of lacquer-like substances suitable for being dissolved in a more or less viscous solution with a volatile solvent capable of forming a film upon the evaporation of the solvent, and in its larger aspects the invention contemplates a new and improved method of generally processing metal foils.

Heretofore thin metal foils in their processing, particularly processing involving coating the same with cellulose acetate films or like films, have been ordinarily processed in the form of continuing bands or webs: however, due to the lack of tensile strength, the bands or webs of the thinner foils, especially foils under .001" thick, have often ruptured and broken, making the cost of processing such bands or webs of thinner foils excessive. It has been widely recognized that if the factor of breakage could be overcome it would be cheap and economical to utilize the thinner coated metal foils for a variety of purposes, because the coatings materially add to the tensile strength of the foil and also fill in or cover microscopic holes or perforations therein, the coated thin metal foils being particularly efficient as a packaging or wrapping medium.

Therefore, it is an object of my invention to process, and to process particularly by coating, a layer of thin and fragile metal foil which is backed up and supported by at least one other layer of metal foil, preferably of equal gauge, and to commence such processing by having two or more layers of foil coincidently wound on a spool so that the layers may be processed in web form as a unit and so that the layers, encountering as they do the stresses and strains of processing together supplement one another's tensile strength, thus giving the double-layered stock more tensile strength than possessed by a single layer.

It is a further object of this invention to coat foil in two layers according to the method described above, in which the layers are fed from a coincidently wound spool, so that the top layer may be first coated and dried and then the double layered web led around guide rolls so that the positions of the layers become reversed, the bottom layer becoming the top layer, after which the second layer is coated and dried and the two layers of foil each having a coating, are then separated and separately wound, the process being continuous.

It will be understood that single or double coatings may be applied to either one or more layers of foil by methods involving my invention, and the accompanying drawing illustrates diagrammatically the manner in which the present invention may be practised, but it is to be expressly understood that the drawing is for the purpose of illustration only and is not to be considered as limiting the invention in any way whatever.

In the drawing:

Fig. 1 is a diagrammatic view of an apparatus which may be employed in the practise of my invention.

Fig. 2 is a cross-section of two layers of foil which have been coated with cellulose acetate in accordance with my invention.

In these figures a spool of foil 10 comprises two layers 12 and 14 of coincidently wound thin fragile metal foil, preferably aluminum foil, which layers are preferably mutually co-extensive and of equal gauge. The layers 12 and 14 are led over guide roller 16 and top layer 12 is coated with a solution of cellulose acetate having a volatile solvent, the coating 18 preferably being applied by extruding the solution from a pressure hopper in accordance with methods described in the patent application of Dr. E. L. Mack and Earle H. Morse, Serial No. 148,382, now Patent No. 2,175,125, granted October 3, 1939, entitled "Method and apparatus for forming films and film coatings"; if desired well known rollercoating or spray-coating methods could be employed. The coating 18 and the two layers of foil 12 and 14 are then led to drier 20 where the volatile solvent of the coating solution is dried out. The triplicate layers 12, 14 and 18 are then led past guide rollers 22 and 24 so that the foil layers 12 and 14 are in reverse position and a cellulose acetate coating 26 is then applied to foil layer 14 by means of extrusion pressure hopper 28, the coating 26 being dried in drier 30, after which the two coated layers of foil 12 and 14 are led over guide roller 32, separated and each wound separately on spools 34 and 36.

Those skilled in the art will recognize the economy and efficiency of processing fragile foils in the manner described above. The method is particularly adapted for thin fragile metal foils of a thickness ranging from .00023"–.001", but can be used to minimize breakage of the web in foils of greater thickness. The method is advantageous in processing or coating various metal foils and is especially desirable for processing extremely thin aluminum foils with a single coating, usually of a cellulose derivative type which gives increased strength to the foil and fills in any microscopic holes, and the method may also be used where it is desired to double coat layers of foil with a primary coating such as Vistanex, and then over-coat the primary coating with a coating of preferably a cellulose derivative type.

Various modifications and combinations of various features of the present invention as heretofore set out by illustrative examples will now occur to those skilled in the art from the drawing and description, and certain procedures described may be replaced by other procedures and certain features used without other features without departing from the spirit of the invention. Reference is therefore to be had to the claims for a definition of said invention.

Having described the invention, what is claimed is:

1. The method of coating thin fragile relatively air impervious metal foil of a thickness ranging from .00023"–.001" which includes the steps of feeding two or more layers of foil in back to back relation from a coincidentally wound roll, coating at least one layer with a film forming material having a volatile solvent and drying the same in a heated drier while maintaining the layers in back to back relation, and then separating the layers.

2. The method of coating fragile metal foils which includes the steps of feeding two layers of foil in back to back relation from a coincidentally wound roll, coating one layer and then reversing the layers and coating the other layer and drying the coatings while maintaining the layers in back to back relation, and then separating the coated layers.

RICHARD SAMUEL REYNOLDS.